United States Patent [19]

Fors et al.

[11] Patent Number: 4,664,792
[45] Date of Patent: May 12, 1987

[54] PLANT FOR TREATMENT OF URBAN RUNOFF WATER

[75] Inventors: Lars B. S. Fors, Wilrijk, Belgium; Bo L. Verner, Saltsjö-Boo, Sweden

[73] Assignee: Atlas Copco Aktiebolag, Nacka, Sweden

[21] Appl. No.: 726,807

[22] Filed: Apr. 25, 1985

[30] Foreign Application Priority Data

Apr. 30, 1984 [SE] Sweden ............................ 8402352

[51] Int. Cl.[4] ............................................ E02B 11/00
[52] U.S. Cl. ............................ 210/170; 210/242.1; 210/242.2; 210/320; 210/600; 210/747; 405/52
[58] Field of Search ................ 210/170, 242.1, 242.2, 210/320, 600, 747; 405/52

[56] References Cited

U.S. PATENT DOCUMENTS

| | | | |
|---|---|---|---|
| 3,476,246 | 11/1969 | Dahan | 210/242.1 |
| 3,844,950 | 10/1974 | Autisa | 210/170 |
| 4,008,155 | 2/1977 | Castell | 210/242.1 |
| 4,268,398 | 5/1981 | Shuck et al. | 210/170 |
| 4,298,470 | 11/1981 | Stallings | 210/170 |
| 4,406,403 | 9/1983 | Leubke | 210/747 |
| 4,473,477 | 9/1984 | Beall | 210/747 |
| 4,485,013 | 11/1984 | Cockman | 210/242.2 |

Primary Examiner—John Doll
Assistant Examiner—Sharon T. Cohen
Attorney, Agent, or Firm—Eric Y. Munson

[57] ABSTRACT

A plant for treatment of urban run off water where a body of water (50) is separated from a water recipient (60) by means of a flexible curtain (13) extending between the bottom (80) and the surface (90) of the water recipient. The bottom end of the curtain is anchored (14) to the bottom while the surface end is provided with float means (11) being movable across the surface to change the volume of the body of water.

4 Claims, 2 Drawing Figures

PLANT FOR TREATMENT OF URBAN RUNOFF WATER

The present invention relates to a plant for treatment of urban runoff water.

BACKGROUND OF THE INVENTION

A major problem with the treatment of urban runoff water is that the peak flow caused by heavy rain is much larger than the average flow. Since it is too expensive to build a sewage treatment station that can handle both sewage and peak flow runoff water different methods have been used. One method is the treatment of sewage and runoff water together in a sewage treatment station. When the flow rate exceeds the capacity of the station excess flow is flooded untreated via a spillway to a recipient. Another method, described in U.S. Pat. No. 4,298,471, uses a basin consisting of several compartments which are interconnected. The first compartment is connected to a channel through which the runoff water is entered. The sewage treatment station is also connected to the first compartment. The last compartment in the series is connected to the surrounding lake. The idea with this solution is that the urban runoff water resulting from heavy rain successively fills up the compartments thereby pushing lake water back into the lake. The basin thus acts as a buffer for the runoff water. This method thus means a substantial improvement relative to the method described before. However, because of temperature and density differences between the runoff water and the lake water, it cannot be avoided that mixing between the contents of the different compartments and between the last compartment and the surrounding lake occur. A part of the polluted runoff water therefore enters into the surrounding lake.

SUMMARY OF THE INVENTION

The object of the present invention is the arrangement of a buffer between the runoff water channel and the sewage treatment station, which buffer is self-adjusting to take care of the current need. Furthermore the buffer is separated from the surrounding recipient so that no mixing occurs. The invention is defined in the appended claims.

BRIEF DESCRIPTION OF THE DRAWINGS

An embodiment of the invention is described below with reference to the accompanying drawing in which.

DETAILED DESCRIPTION OF THE PREFERRED EMBODIMENT OF THE INVENTION

Figure 1:
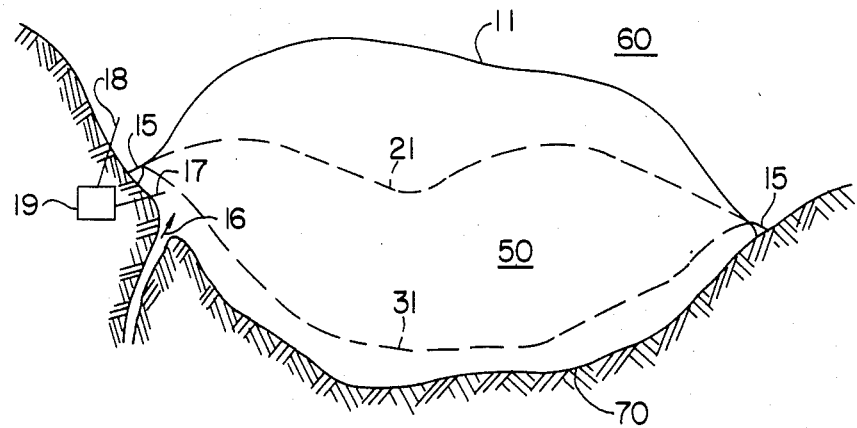
FIG. 1 is a schematic view from above and FIG. 2 a schematic section through a plant according to the invention.
Figure 2:
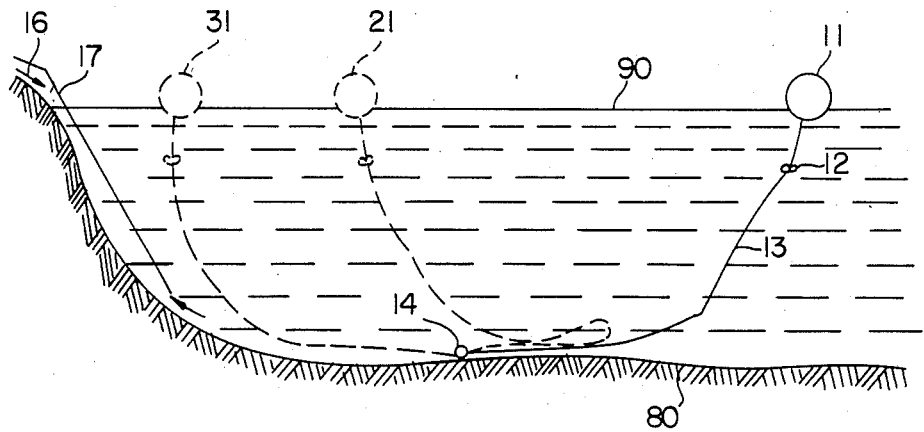

The plant shown in the drawing comprises a sewage treatment station 19 the inlet 17 of which is connected to a body of water 50. The body of water is positioned in a water recipient 60, e.g. a lake. The outlet 18 from the sewage treatment station is connected to the water recipient. A chanel 16 conducts the urban runoff water into the body of water 50 which is arranged along the shore 70 of water recipient 60. A flexible curtain 13 provided with float means 11 is secured to the shore at 15. The curtain separates the body of water 50 from water recipient 60 and is preferably made of a fabric reinforced plastic or rubber liner. The curtain is provided with means 14 in form of fixation weight at the bottom end of the curtain. The curtain is in this way anchored at a predetermined position on the bottom 80. Float means 11 is preferably in form of an airfilled hose. The buoyancy force shoud be so dimensioned that the hose is dragged down under the water surface 90 of the body of water 50 when this surface is a predetermined distance above the surface of the water recipient 60. In this way a safety opening is obtained if for instance the sewage treatment station breaks down. Float means 11 is movable across the surface of the water recipient, as shown in dashed lines at 21 and 31, to change the volume of the body of water 50. In this way the volume of the buffer 50 is adjusted to the current need. The flexible curtain 13 could advantageously be provided with a bubble hose 12 on either side to prevent the formation of ice around the float means. The small airflow needed could be taken from the sewage treatment station. In the winter season it is also possible to fill hose 11 with water so that it sinks. The reason is that there is so little runoff water in the winter that no buffer is needed.

The shown plant operates in the followig way. Urban runoff water from channel 16 enters the body of water 50. When the flow rate exceeds the capacity of sewage treatment station 19, float means 11 and thus the flexible curtain 13 is pushed away from the shore 70 as indicated by the successive positions marked 31, 21 and 11. When the flow rate in channel 16 decreases so that the capacity of the sewage treatment station becomes higher, the volume of the body of water 50 decreases so that the surface level inside hose 11 becomes lower than the level of the surface in the water recipient 60 outside hose 11. This difference in level causes hose 11 and thus flexible curtain 13 to move towards the shore 70.

We claim:

1. In a plant for treatment of urban runoff water comprising a sewage treatment station (19) having an inlet (17) connected to a body of water (50) for receiving urban runoff water (16), said body of water being positioned in a water recipient (60) connected to an outlet (18) of said sewage treatment station, the improvement comprising:

flexible curtain means (13) extending between the bottom (80) and the surface (90) of said water recipient for separating said body of water from said water recipient, means (14) for anchoring the bottom of said flexible curtain means at a predetermined position on the bottom of said water recipient, and means for adjusting the volume of said body of water including float means (11) mounted to said flexible curtain means at the surface of said water recipient, said float means being movable across the surface of said water recipient.

2. The improvement of claim 1 wherein said float means comprises an airfilled hose (11), said hose being dimensioned such that the buoyancy thereof causes said hose to descend below the surface of said body of water when the surface of said body of water is a predetermined distance above the surface of said water recipient.

3. The improvement according to claim 1 further including means for preventing the formation of ice around said float means, said means including a bubble hose (12) provided on either side of said flexible curtain means.

4. The improvement according to claim 2 further including a bubble hose (12) provided on either side of said flexible curtain means for preventing the formation of ice round said float means.

* * * * *